United States Patent
Funaki et al.

(10) Patent No.: US 6,753,393 B2
(45) Date of Patent: Jun. 22, 2004

(54) FLUOROCOPOLYMER

(75) Inventors: Atsushi Funaki, Chiba (JP); Tatsuya Miyajima, Chiba (JP); Naoko Sumi, Chiba (JP); Eiichi Nishi, Chiba (JP); Hiroki Kamiya, Chiba (JP)

(73) Assignee: Asahi Glass Company, Limited, Tokyo (JP)

( * ) Notice: Subject to any disclaimer, the term of this patent is extended or adjusted under 35 U.S.C. 154(b) by 8 days.

(21) Appl. No.: 10/356,536

(22) Filed: Feb. 3, 2003

(65) Prior Publication Data

US 2003/0153703 A1 Aug. 14, 2003

(30) Foreign Application Priority Data

Feb. 13, 2002 (JP) ........................................ 2002-035430

(51) Int. Cl.$^7$ ............................................. C08F 114/18
(52) U.S. Cl. ....................... 526/250; 526/253; 526/348.8
(58) Field of Search ................................. 526/250, 253, 526/348.8

(56) References Cited

U.S. PATENT DOCUMENTS

| 4,123,602 A | * 10/1978 | Ukihashi et al. ............ 522/187 |
| 4,338,237 A | 7/1982 | Sulzbach et al. |
| 4,513,129 A | * 4/1985 | Nakagawa et al. ......... 526/249 |
| 5,554,425 A | 9/1996 | Krause et al. |

FOREIGN PATENT DOCUMENTS

| DE | 28 36 296 | * 8/1978 |
| DE | 31 15 030 | 11/1982 |
| EP | 1 236 746 | 9/2002 |
| JP | 59-50163 | 12/1984 |
| JP | 7-53823 | 2/1995 |
| JP | 7-173446 | 7/1995 |
| JP | 9-194815 | 7/1997 |
| JP | 2002-357285 | 12/2002 |
| WO | WO 98/55557 | 12/1998 |

* cited by examiner

*Primary Examiner*—Bernard Lipman
(74) *Attorney, Agent, or Firm*—Oblon, Spivak, McClelland, Maier & Neustadt, P.C.

(57) ABSTRACT

A fluorocopolymer which comprises (A) polymerized units based on tetrafluoroethylene, (B) polymerized units based on ethylene and (C) polymerized units based on a compound represented by $CH_2=CX(CF_2)_2Y$ (wherein each of X and Y which are independent of each other, is a hydrogen atom or a fluorine atom), wherein the molar ratio of (A)/(B) is from 20/80 to 80/20, and the molar ratio of (C)/((A)+(B)) is from 1/1000 to 15/100, and which has a volume flow rate of from 1 to 1000 mm$^3$/sec. The fluorocopolymer has a low fuel permeability coefficient and is excellent in the fuel barrier properties.

18 Claims, No Drawings

FLUOROCOPOLYMER

The present invention relates to a fluorocopolymer which has a low fuel permeation coefficient and is excellent in the fuel barrier properties.

A fluoropolymer (or a fluorocarbon resin) such as a polytetrafluoroethylene, a tetrafluoroethylene/perfluoro (alkyl vinyl ether) copolymer or an ethylene/tetrafluoroethylene copolymer, has excellent properties such as heat resistance, chemical resistance, weather resistance and gas barrier properties and thus is used in various fields such as semiconductor industry and automobile industry.

In recent years, an application of a fluoropolymer to a part such as a tank, a hose or a tube, particularly to a fuel hose to be used in an engine room of an automobile which is exposed to a severe condition of e.g. a high temperature environment, has been studied. A fuel hose is a hose for piping to transport a gasoline fuel containing an alcohol or an aromatic compound.

Especially, a fuel hose made of a multilayer laminate containing a fluoropolymer, has been studied as one satisfying various required properties. As the material for the inner layer which is in contact directly with a fuel, in the multilayer laminate, it is essential to use a resin which has fuel barrier properties whereby a fuel is hardly permeable, and chemical resistance to an erosive liquid such as ethanol or methanol to be added in the fuel. From this viewpoint, the fluoropolymer is suitable as the material for the inner layer, since it is excellent in the heat resistance, chemical resistance and gas barrier properties. On the other hand, as the material for the outer layer of a fuel hose, a non-fluorinated polymer excellent in the mechanical properties or durability, will be used. Usually, a polyamide resin such as polyamide 6, polyamide 11 or polyamide 12, is suitable as a non-fluorinated polymer, since it has such excellent properties.

In order to prevent air pollution due to fuels discharged from automobiles, severe regulations have been set which relate to the amount of gasoline permeated from a fuel hose. To cope with such a situation, it is required to further improve the fuel barrier properties of the material constituting a fuel hose. For this purpose, as the material constituting a fuel hose, an ethylene/tetrafluoroethylene copolymer which is excellent in the fuel barrier properties among fluoropolymers and which is excellent also in mechanical properties, is used. However, as the regulations are expected to be severer in future, it is desired to develop a fluorocopolymer having the fuel barrier properties further improved.

It is an object of the present invention to provide a fluorocopolymer excellent in the fuel barrier properties, which is desired to be developed under the above-mentioned background.

The present invention provides a fluorocopolymer which comprises (A) polymerized units based on tetrafluoroethylene, (B) polymerized units based on ethylene and (C) polymerized units based on a compound represented by $CH_2=CX(CF_2)_2Y$ (wherein each of X and Y which are independent of each other, is a hydrogen atom or a fluorine atom), wherein the molar ratio of (A)/(B) is from 20/80 to 80/20, and the molar ratio of (C)/((A)+(B)) is from 1/1000 to 15/100, and which has a volume flow rate of from 1 to 1000 $mm^3$/sec.

Now, the present invention will be described in detail with reference to the preferred embodiments.

In the present invention, the molar ratio of (A) polymerized units based on tetrafluoroethylene (hereinafter referred to as TFE) to (B) polymerized units based on ethylene (hereinafter referred to as E), is from 20/80 to 80/20, preferably from 50/50 to 70/30, more preferably 50/50 to 60/40. If the molar ratio of (A)/(B) is too small, the heat resistance, weather resistance, chemical resistance, gas barrier properties, fuel barrier properties, etc. of the fluorocopolymer tend to decrease, and if the molar ratio is too large, the mechanical strength, melt processability, etc. tend to decrease. When the molar ratio is within this range, the fluorocopolymer will be excellent in the properties such as the heat resistance, weather resistance, chemical resistance, gas barrier properties, fuel barrier properties, mechanical strength and melt processability. In the fluorocopolymer of the present invention, the content of (C) polymerized units based on a compound (hereinafter referred to as FAE) of the above formula $CH_2=CX(CF_2)_2Y$ is such that the molar ratio of (C)/((A)+(B)) is from 1/1,000 to 15/100. When the content of (C) is within this range, the fluorocopolymer will be excellent in the fuel barrier properties and cracking resistance and is free from a breaking phenomenon such that the fluorocopolymer undergoes cracking under stress. Further, the fluorocopolymer will be excellent in strength. Such a content of (C) is preferably from 1/200 to 7/100, more preferably from 1/100 to 5/100, most preferably from 1/100 to 4/100.

FAE is a compound of the formula $CH_2=CX(CF_2)_2Y$ (wherein each of X and Y which are independent of each other, is a hydrogen atom or a fluorine atom), as mentioned above. FAE may, for example, be $CH_2=CH(CF_2)_2F$, $CH_2=CF(CF_2)_2F$, $CH_2=CF(CF_2)_2H$ or $CH_2=CH(CF_2)_2H$. More preferred is $CH_2=CH(CF_2)_2F$ where X is a hydrogen atom, and Y is a fluorine atom.

The fluorocopolymer of the present invention may contain, in addition to the polymerized units based on the above (A), (B) and (C), polymerized units based on another monomer (D) other than (A), (B) and (C).

Such another monomer (D) may, for example, be a hydrocarbon olefin such as propylene or butene, a fluoroolefin having hydrogen atoms on an unsaturated group, such as vinyl fluoride or vinylidene fluoride (except for FAE), a fluoroolefin having no hydrogen atom on an unsaturated group, such as hexafluoropropylene, chlorotrifluoroethylene or a perfluoro(alkyl vinyl ether) (except for TFE), a vinyl ether such as an alkyl vinyl ether, a (fluoroalkyl) vinyl ether, glycidyl vinyl ether, hydroxybutyl vinyl ether or methyl vinyloxybutyl carbonate, a vinyl ester such as vinyl acetate or vinyl butyrate, a (meth)acrylate such as a (polyfluoroalkyl) acrylate or a (polyfluoroalkyl) methacrylate, an unsaturated carboxylic anhydride such as maleic anhydride, citraconic anhydride or itaconic anhydride, or an unsaturated carboxylic acid such as undecylenic acid, acrylic acid, methacrylic acid or maleic acid. Such another monomer may be used alone or in combination of two or more of them.

In a case where the fluorocopolymer contains polymerized units based on such another monomer (D), the content is preferably from 0.01 to 10 mol %, more preferably from 0.1 to 5 mol %, based on the total polymerized units in the fluorocopolymer.

It is preferred that the fluorocopolymer of the present invention has a molding temperature close to the molding temperature of a non-fluorinated polymer, so that it can be co-extruded with the non-fluorinated polymer to form a multilayer laminate. For this purpose, it is preferred to optimize the melting point of the fluorocopolymer by properly adjusting the proportions of (A), (B) and (C) within the above ranges. Further, it is preferred to incorporate polymerized units based on (D), since it is thereby possible to improve the co-extrusion processability with the non-fluorinated polymer by further controlling the melting point of the fluorocopolymer, or to improve the adhesive properties to other layers in the multilayer laminate. For the purpose of improving the adhesive properties, it is preferred to incorporate polymerized units based on (D) having a functional group which is reactive with the non-fluorinated polymer such as a polyamide, such as an ester group, a carbonate group, a hydroxyl group, a carboxyl group, a carboxylic anhydride residual group, a carbonyl fluoride group or an epoxy group.

Further, in the present invention, it is preferred to have, as a terminal group of the fluorocopolymer, a functional group reactive with a non-fluorinated polymer such as a polyamide, such as an ester group, a carbonate group, a hydroxyl group, a carboxyl group or a carbonyl fluoride group, whereby the adhesive properties to other layers in a multilayer laminate will be improved. It is preferred to introduce such a terminal group by properly selecting a radical polymerization initiator, a chain transfer agent or the like, to be used for the production of the fluorocopolymer.

The volume flow rate (hereinafter referred to as value Q) of the fluorocopolymer of the present invention is from 1 to 1,000 $mm^3$/sec. The value Q is an index for the melt flowability of the fluorocopolymer and may be used as a rough standard for the molecular weight. Namely, the larger the value Q, the lower the molecular weight, and the smaller the value Q, the higher the molecular weight. The value Q in the present invention is the extrusion rate of the fluorocopolymer when it is extruded through an orifice having a diameter of 2.1 mm and a length of 8 mm at a temperature of 297° C. under a load of 7 kg, by means of a flow tester manufactured by Shimadzu Corporation. If the value Q is too small, the extrusion tends to be difficult, and if it is too large, the mechanical strength of the fluorocopolymer tends to decrease. The value Q is preferably from 5 to 500 $mm^3$/sec, more preferably from 10 to 200 $mm^3$/sec.

The method for producing the fluorocopolymer of the present invention is not particularly limited, and a polymerization method employing a commonly employed radical polymerization initiator, may be used. As an example of the polymerization method, bulk polymerization, solution polymerization employing an organic solvent such as a fluorinated hydrocarbon, a chlorinated hydrocarbon, a fluorochlorinated hydrocarbon, an alcohol or a hydrocarbon, suspension polymerization employing an aqueous medium and, if necessary, a suitable organic solvent, or emulsion polymerization employing an aqueous medium and an emulsifier, may be mentioned.

The radical polymerization initiator is preferably such that the decomposition temperature of 10 hours half-life is from 0° C. to 100° C., more preferably from 20 to 90° C. As a specific example, it may, for example, be an azo compound such as azobisisobutylonitrile, a non-fluorinated diacyl peroxide such as isobutyryl peroxide, octanoyl peroxide, benzoyl peroxide or lauroyl peroxide, a peroxy dicarbonate such as diisopropylperoxy dicarbonate, a peroxyester such as tert-butylperoxy pivalate, tert-butylperoxy isobutyrate, or tert-butylperoxy acetate, a fluorinated diacylperoxide such as a compound represented by $(Z(CF_2)_pCOO)_2$ (wherein Z is a hydrogen atom, a fluorine atom or a chlorine atom, and p is an integer of from 1 to 10), or an inorganic peroxide such as potassium persulfate, sodium persulfate or ammonium persulfate.

In the present invention, the amount of the radical polymerization initiator is preferably from 0.001 to 10 parts, more preferably from 0.01 to 1 part, per 100 parts of the charged monomers.

Further, in the present invention, it is also preferred to use a chain transfer agent to control the value Q of the fluorocopolymer. The chain transfer agent may, for example, be an alcohol such as methanol or ethanol, a chlorofluorohydrocarbon such as 1,3-dichloro-1,1,2,2,3-pentafluoropropane or 1,1-dichloro-1-fluoroethane, or a hydrocarbon such as pentane, hexane or cyclohexane. Further, it is preferred to employ a chain transfer agent having a functional group such as an ester group, a carbonate group, a hydroxyl group, a carboxyl group or a carbonyl fluoride group, whereby a terminal group having a reactivity with a polyamide, can be introduced. As such a chain transfer agent, acetic acid, methyl acetate, ethylene glycol or propylene glycol may, for example, be mentioned.

In the present invention, the polymerization conditions are not particularly limited. The polymerization temperature is preferably from 0° C. to 100° C., more preferably from 20 to 90° C. The polymerization pressure is preferably from 0.1 to 10 MPa, more preferably from 0.5 to 3 MPa. The polymerization time is preferably from 1 to 30 hours.

The fluorocopolymer of the present invention is excellent in the fuel barrier properties. As an index for the fuel barrier properties, it is preferred to compare the fuel permeability coefficient which can be measured in accordance with a cup method as stipulated in JIS Z0208. The lower the fuel permeability coefficient, the better the fuel barrier properties. The fluorocopolymer of the present invention is characterized in that the fuel permeability coefficient is low. The fuel permeability coefficient is preferably at most 3.5 gmm/$m^2$/24 hr, more preferably at most 3.0 gmm/$m^2$/24 hr, most preferably at most 2.7 gmm/$m^2$/24 hr.

For the bonding between the fluorocopolymer of the present invention and a non-fluorinated polymer, it is preferred not only to improve the adhesive properties by incorporating polymerized units based on (D) or by introducing a reactive functional group as a terminal group, as mentioned above, but also to insert an adhesive layer between the layer of the fluorocopolymer and the layer of a non-fluorinated polymer. As such an adhesive layer, a fluorocopolymer having adhesive properties, is preferred.

As an adhesive fluorocopolymer, a fluorocopolymer composition produced by the following method, or a grafted fluorocopolymer composition, is preferred.

Namely, preferred is a fluorocopolymer composition (which may also be called a fluorocopolymer modified product, a fluorocopolymer compound or a fluorocopolymer blend product) having an organic peroxide blended to the fluorocopolymer of the present invention, followed by heat treatment.

The organic peroxide to be used here, is preferably such that a decomposition temperature of 1 minute half-life is from 150 to 280° C., more preferably from 170 to 240° C. Specifically, it may, for example, be an aliphatic peroxide such as 2,5-dimethyl-2,5-bis(tert-butylperoxy)hexane, di-tert-butyl peroxide or 2,5-dimethyl-2,5-bis(tert-butylperoxy)hexine-3, an aromatic peroxide such as 1,4-bis(α-tert-butylperoxyisopropyl)benzene, tert-butylcumyl peroxide or dicumyl peroxide, a ketone peroxide such as methyl ethyl ketone peroxide, a diacyl peroxide such as benzoyl peroxide, a peroxydicarbonate such as diisopropylperoxydicarbonate, an alkyl peroxyester such as tert-butylperoxy isobutyrate, or a hydroperoxide such as tert-butyl hydroperoxide. The organic peroxide may be liquid or solid. The amount of the organic peroxide to be incorporated, is from 0.01 to 10 parts, preferably from 0.1 to 5 parts, per 100 parts of the fluorocopolymer.

As the method for blending an organic peroxide to the fluorocopolymer, followed by heat treatment, it is preferred to employ a method wherein an organic peroxide is mixed to the fluorocopolymer in a powder or granular form by a mixer, followed by melt extrusion. By this method, the organic peroxide is blended to the fluorocopolymer and at the same time, heat-treated to obtain a pelletized fluorocopolymer composition. The heat treatment temperature is preferably from 150 to 280° C., more preferably from 220 to 280° C. i.e. at least the melting point of the fluorocopolymer. Further, the heat treatment time is preferably short, more preferably from 0.1 to 30 minutes, particularly preferably from 0.5 to 10 minutes.

For the melt extrusion, it is preferred to employ a single screw or twin screw extruder. The cylinder temperature of the extruder is preferably from 100 to 350° C., and the crosshead temperature and the die temperature are each preferably from 200 to 350° C. The rotational speed of the screw is not particularly limited, but it is preferably from 100 to 200 rpm. The retention time in the extruder of the fluorocopolymer is preferably from 1 to 10 minutes. The diameter of the discharge opening of the die is preferably from 2 to 20 mm. A string shaped fluorocopolymer melted and discharged from the discharge opening, is, while being extended, cooled and solidified by water or air and then cut by a cutter to obtain columnar pellets having a length of from 1 to 5 mm and a diameter of from 1 to 5 mm.

In the present invention, as the adhesive fluorocopolymer, a grafted fluorocopolymer composition is preferred which is obtained by blending a compound (hereinafter referred to as a grafting compound) having a bonding group which can be grafted and a functional group which is capable of imparting adhesive properties, in addition to the organic peroxide, to the fluorocopolymer, followed by heat treatment. By such heat treatment, the grafting compound is grafted to the fluorocopolymer, whereby the functional group to impart adhesive properties, will be introduced to the fluorocopolymer. With the grafted fluorocopolymer composition, the adhesive properties to the non-fluorinated polymer will be improved as compared with the fluorocopolymer to a level of equal to or higher than the above-mentioned fluorocopolymer composition.

The functional group to improve the adhesive properties by grafting, is a group having a reactivity or polarity, and it may, for example, be a carboxyl group, a residual group having two carboxyl groups in one molecule dehydrated for condensation (hereinafter referred to as a carboxylic anhydride residual group), an epoxy group, a hydroxyl group, an isocyanate group, an ester group, an amide group, an aldehyde group, an amino group, a hydrolyzable silyl group, a cyano group, a carbon-carbon double bond, a sulfonic group or an ether group. Among them, preferred is a carboxyl group, a carboxylic anhydride residual group, an epoxy group, a hydrolyzable silyl group or a carbon-carbon double bond. Such a functional group may be contained in a single type in one molecule of the fluorocopolymer, or two or more different types may be contained. Further, two or more such functional groups may be present in one molecule of the fluorocopolymer.

Further, the grafting compound is a compound having the above functional group, and an organic group having an unsaturated double bond or a peroxy group. For example, it may be an unsaturated carboxylic acid, an epoxy group-containing unsaturated compound, a hydrolyzable silyl group-containing unsaturated compound, or an epoxy group-containing peroxy compound. It is preferably an unsaturated carboxylic anhydride such as maleic anhydride or fumaric anhydride, more preferably maleic anhydride. The amount of the grafting compound to be used, is preferably from 0.001 to 10 parts by mass, more preferably from 0.005 to 5 parts by mass, most preferably from 0.01 to 3 parts by mass, per 100 parts by mass of the fluorocopolymer.

The multilayer laminate formed by using the fluorocopolymer of the present invention preferably comprises (F) a layer of the fluorocopolymer and (G) a layer of the non-fluorinated polymer. (F) and (G) may not necessarily be laminated so that they are in direct contact. It is especially preferred to have (H) a layer of the fluorocopolymer composition or the grafted fluorocopolymer composition interposed between (F) and (G), since the adhesive properties will be thereby improved. The multilayer laminate may, for example, be a (F)/(G) laminate, a (F)/(H)/(G) laminate, a (J)/(F)/(H)/(G) laminate having (J) a layer of a fluorocarbon resin further laminated or a (F)/(H)/(G)/(G) laminate having (G) further added. Here, it is preferred to make (F), (J) or (H) the inner layer, whereby the fuel barrier properties will be excellent.

Further, the multilayer laminate formed by using the fluorocopolymer of the present invention, is preferably a laminate comprising (F) and (J). For example, it may be a multilayer laminate such as a (F)/(J) laminate, a (F)/(J)/(J) laminate or a (J)/(F)/(J) laminate.

Further, the fluorocopolymer of the present invention is most preferably employed as the innermost layer which will be in direct contact with a fuel, whereby the fuel barrier properties will be excellent. Further, the fluorocopolymer or the fluorocarbon resin for the innermost layer in contact with the fuel preferably has electrical conductivity. It is particularly preferred to employ a fluorocopolymer or a fluorocarbon resin having electroconductive carbon black incorporated. As the degree of the electrical conductivity, the volume resistivity is preferably at most $1 \times 10^9$ Ω·cm.

In the present invention, the adhesion strength between the fluorocopolymer layer and the non-fluorinated polymer layer is preferably at least 30 N/cm, more preferably at least 40 N/cm, as interlaminar peel strength. To obtain excellent adhesion strength, it is preferred to laminate them with a layer of a fluorocopolymer composition or a grafted fluorocopolymer composition interposed therebetween.

The above multilayer laminate is preferably obtained by co-extrusion of the fluorocopolymer, the non-fluorinated polymer and, if necessary, the fluorocopolymer composition or the grafted fluorocopolymer composition. The co-extrusion is usually a method for obtaining a laminate of two or more layers in the form of a film or a tube. Melts discharged from the outlets of two or more extruders, will be in contact in a molten state and passed through a die, whereby they are formed into a laminate. With respect to the extrusion temperature, the screw temperature is preferably from 100 to 350° C., and the die temperature is preferably from 200 to 350° C. The screw rotational speed is not particularly limited, but it is usually preferably from 10 to 200 rpm. The retention time of the melt in the extruder is preferably from 1 to 20 minutes. The non-fluorinated polymer to be used for lamination with the fluorocopolymer of the present invention, the fluorocopolymer composition and the grafted fluorocopolymer composition may, for example, be a polyamide such as polyamide 6, polyamide 66, polyamide 46, polyamide 11, polyamide 12 or polyamide MXD6 (semiaromatic polyamide), a polyester such as polyethylene terephthalate, polybutylene terephthalate, polyethylene naphthalate or polybutylene naphthalate, polyethylene, poly(ethylene/vinyl acetate), polypropylene, polystyrene, polyvinylidene chloride, polyvinyl acetate, polyvinyl alcohol, poly(ethylene/vinyl alcohol), polyacrylonitrile, polyoxymethylene, polyphenylene sulfide, polyphenylene ether, polycarbonate, polyamideimide, polyether imide, polysulfone or polyarylate.

The non-fluorinated polymer is preferably polyamide 6, polyamide 66, polyamide 46, polyamide 11, polyamide 12 or polyamide MXD6, particularly preferably polyamide 11 or polyamide 12.

Applications of the fluorocopolymer of the present invention and the multilayer laminate obtained therefrom, include fuel hoses for automobiles, multilayer hoses for industrial use, multilayer hoses for food products, weather resistant multilayer films, chemical resistant linings, weather resistant linings and adhesives for a fluorinated polymer and a non-fluorinated polymer.

Now, the present invention will be described in further detail with reference to Examples (Examples 1 to 5) and Comparative Example (Example 6). However, it should be understood that the present invention is by no means restricted to such specific Examples. Here, the fuel permeability coefficient and the MIT folding endurance were measured by the following methods.

Fuel Permeability Coefficient

The fuel permeability coefficient of the fluorocopolymer was measured in accordance with a cup method as prescribed in JIS Z0208. From 9.5 to 10 g of fuel E10 (volume ratio of isooctane:toluene:ethanol=50:50:10) was put into a cup having a permeation area of 28.26 cm$^2$, and the top of the cup was covered with a fluorocopolymer sample having a thickness of 100 μm, obtained by press-molding and maintained at 60° C. for 10 days, whereupon from the reduction in mass, the fuel permeability coefficient was obtained. The lower the fuel permeability coefficient, the better the fuel barrier properties.

MIT Folding Test

Measured in accordance with ASTM D2176. Namely, a test specimen having a width of 12.5 mm, a length of 130 mm and a thickness of 0.23 mm, was mounted on a MIT measuring equipment, manufactured by Toyo Seiki Seisakusho, and the test specimen was folded under such conditions that the load was 1.25 kg, the folding angle to the left and to the right was 135°, and the number of folding times was 175 times/min, whereby the number of times until the test specimen broke was measured. This test is a test for resistance to fatigue from flexing, of the fluorocopolymer, and the measured value will be an index for cracking resistance. The larger the number of times, the better the cracking resistance.

EXAMPLE 1

A polymerization vessel having an internal capacity of 94 l and equipped with a stirrer, was deaerated, and 19.7 kg of water, 77.4 kg of 1-hydrotridecafluorohexane, 0.38 kg of pentane and 0.25 kg of $CH_2=CHCF_2CF_3$ were charged. 11.06 kg of TFE and 0.38 kg of E were injected, and the temperature in the polymerization vessel was raised to 50° C. As a polymerization initiator solution, 350 ml of a 1% 1,3-dichloro-1,1,2,2,3-pentafluoropropane (hereinafter referred to as AK225cb, manufactured by Asahi Glass Company, Limited) solution of $(F(CF_2)_3COO)_2$ was charged to initiate the polymerization. A monomer mixture gas of TFE/E in a molar ratio of 60/40 was continuously charged so that the pressure would be constant during the polymerization. Further, along with the charging of the monomer mixture gas, $CH_2=CHCF_2CF_3$ was continuously charged in an amount corresponding to 2.0 mol % based on the total molar amount of TFE and E. During the polymerization, the above-mentioned polymerization initiator solution was charged so that the polymerization rate would be substantially constant. The total amount of the polymerization initiator solution charged was 2,680 ml. Upon expiration of 4.5 hours from the initiation of the polymerization, and when 11.0 kg of the monomer mixture gas was charged, the internal temperature of the polymerization vessel was lowered to room temperature, and the pressure of the polymerization vessel was purged to normal pressure.

The obtained fluorocopolymer 1 in a slurry form was put into a 200 l granulation vessel having 75 kg of water charged and then granulated with stirring, while distilling off the solvent by raising the temperature to 105° C. The obtained granules were dried at 150° C. for 5 hours to obtain 11.4 kg of granule 1 of fluorocopolymer 1.

From the results of the melt NMR analysis and the fluorine content analysis, the composition of fluorocopolymer 1 was such that the molar ratio of polymerized units based on TFE/polymerized units based on E/polymerized units based on $CH_2=CHCF_2CF_3$ was 57.2/42.8/1.8. The melting point of fluorocopolymer 1 was 245° C., and the value Q was 7.6 mm$^3$/sec. Granule 1 was press-molded at 300° C. to obtain films having thicknesses of 0.23 mm and 100 μm. Using these films, the MIT folding test and the measurement of the fuel permeability coefficient were carried out. The number of MIT folding times was 67,000 times, and the fuel permeability coefficient was 2.27 gmm/m$^2$/24 hr, whereby the films were found to be excellent in cracking resistance and fuel barrier properties.

By means of an extruder, granule 1 was melt-kneaded at 260° C. for a retention time of 2 minutes to obtain pellets 1. Further, 15 parts of carbon black (granular acetylene black, manufactured by Denki Kagaku Kogyo K. K.) was blended to 100 parts of granule 1, and by means of an extruder, the blend was melt-kneaded at 260° C. for a retention time of 2 minutes to obtain pellets 2 of electroconductive fluorocopolymer 1b.

Pellets 2 were supplied to a cylinder for forming an inner layer, and pellets 1 were supplied to a cylinder for forming an outer layer, and they were transported to the transport zones of the respective cylinders. The heating temperature at the transport zones was 300° C. By adjusting the temperature of the coextrusion die to 300° C., two layer coextrusion was caried out to obtain a two layer laminated tube. The outer diameter of the laminated tube was 8 mm, the inner diameter was 6 mm, and the thickness was 1 mm. The thickness of the inner layer of electroconductive fluorocopolymer 1b was 0.2 mm, and the thickness of the outer layer of fluorocopolymer 1 was 0.8 mm. The peel strength between the inner layer and the outer layer was measured, whereby no peeling was possible, and partial cohesive failure was observed, thus showing high adhesion strength. The volume resistivity of the inner layer of electroconductive fluorocopolymer 1b was $5\times10^4$ Ω·cm.

EXAMPLE 2

To 100 parts of granule 1 obtained in Example 1, 1.5 parts of tert-butyl peroxide and 0.1 part of maleic anhydride were uniformly mixed and then melt-mixed at 260° C. for a retention time of 3 minutes by means of a twin screw extruder, to obtain pellets 3 of grafted fluorocopolymer composition 1c having an organic peroxide and maleic anhydride incorporated and having heat treatment applied. Pellets 3 were press-molded at 300° C. to obtain films having thicknesses of 0.23 mm and 100 μm. The number of MIT folding times and the fuel permeability coefficient of such films were equal to the films of fluorocopolymer 1 as disclosed in Example 1, whereby the films were found to be excellent in cracking resistance and fuel barrier properties.

Polyamide 12 (3030JLX2, manufactured by Ube Industries, Ltd) was supplied to a cylinder for forming an outer layer, pellets 3 were supplied to a cylinder for forming an inter layer, and pellets 2 obtained in Example 1 were supplied to a cylinder for forming an inner layer, and they were transported to the transport zones of the respective cylinders. The heating temperatures at the transport zones of polyamide 12, pellets 3 and pellets 2 were 240° C., 260° C. and 310° C., respectively. By adjusting the temperature of the co-extrusion die to 260° C., three layer co-extrusion was carried out to obtain a three layer laminated tube. The outer diameter of the laminated tube was 8 mm, the inner diameter was 6 mm, and the thickness was 1 mm. The outer layer of polyamide 12, the interlayer of grafted fluorocopolymer composition 1c and the inner layer of electroconductive fluorocopolymer 1b were 0.7 mm, 0.1 mm and 0.2 mm, respectively.

In the same manner as in Example 1, the peel strength between the respective layers was measured. The interlayer of grafted fluorocopolymer composition 1c and the inner layer of electroconductive fluorocopolymer 1b could not be peeled, and partial cohesive failure was observed, thus showing high adhesion strength. The peel strength between the interlayer of grafted fluorocopolymer composition 1c and the outer layer of polyamide 12, was 43 N/cm, thus showing high adhesion strength.

EXAMPLE 3

To 100 parts of pellets 3 obtained in Example 2, 15 parts of carbon black (granular acetylene black, manufactured by Denki Kagaku Kogyo K. K.) was blended, and melt-kneaded at 260° C. for a retention time of 2 minutes by means of an extruder, to obtain pellets 4 of electroconductive grafted fluorocopolymer 1cb.

Polyamide 12 of Example 2 was supplied to a cylinder for forming an outer layer, pellets 4 were supplied to a cylinder for forming an inner layer, and they were transported to the transport zones of the respective cylinders. The heating temperatures at the transport zones of polyamide 12 and pellets 4 were 240° C. and 310° C., respectively. By adjusting the temperature of the co-extrusion die to 260° C., co-extrusion was carried out to obtain a two layer laminated tube. The outer diameter of the laminated tube was 8 mm, the inner diameter was 6 mm, and the thickness was 1 mm. The thicknesses of the outer layer of polyamide 12 and the inner layer of electroconductive grafted fluorocopolymer composition 1cb, were 0.8 mm and 0.2 mm, respectively.

In the same manner as in Example 1, the peel strength was measured. The peel strength between the inner layer of electroconductive grafted fluorocopolymer composition 1cb and the outer layer of polyamide 12, was 42 N/cm, thus showing high adhesion strength.

EXAMPLE 4

Polymerization and granulation were carried out in the same manner as in Example 1 except that as the polymerization initiator, a 10% AK225cb solution of diisopropyl peroxydicarbonate was charged in an amount of 190 ml at the initiation of the polymerization and in the total amount of 950 ml, to obtain 11.8 kg of fluorocopolymer 2 and granule 2. The polymerization time was 6.5 hours. From the results of the melt NMR analysis and the fluorine content analysis, the composition of fluorocopolymer 2 was such that the molar ratio of polymerized units based on TFE/polymerized units based on E/polymerized units based on $CH_2=CHCF_2CF_3$ was 58.2/41.8/3.1. The melting point of fluorocopolymer 2 was 232° C., and the value Q was 15.7 $mm^3/sec$. Further, the number of MIT folding times of the film obtained by forming granule 2 in the same manner as in Example 1, was 85,000 times and the fuel permeability coefficient was 2.53 $gmm/m^2/24$ hr, whereby it was found to be excellent in cracking resistance and fuel barrier properties.

Using granule 2, pellets 5 of electroconductive fluorocopolymer 2b was prepared in the same manner as in Example 1. Using polyamide 12 of Example 2, pellets 3 of Example 2 and pellets 5, lamination was carried out in the same manner as in Example 2 to obtain a three layer laminated tube comprising an outer layer of polyamide 12, an interlayer of grafted fluorocopolymer composition 1c and an inner layer of electroconductive fluorocopolymer 2b. The interlayer of grafted fluorocopolymer composition 1c and the inner layer of electroconductive fluorocopolymer 2b could not be peeled and partial cohesive failure was observed, thus showing high adhesion strength. The peel strength between the interlayer of grafted fluorocopolymer composition 1c and the outer layer of polyamide 12, was 43 N/cm, thus showing high adhesion strength.

EXAMPLE 5

Polymerization and granulation were carried out in the same manner as in Example 1 except that the amount of $CH_2=CHCF_2CF_3$ charged before the polymerization was changed to 0.42 kg, and the amount charged during the polymerization was changed to an amount corresponding to 3.3 mol % based on the total molar amount of TFE and E, to obtain 11.5 kg of fluorocopolymer 3 and granule 3. The polymerization time was 5.6 hours. From the results of the melt NMR analysis and the fluorine content analysis, the composition of fluorocopolymer 3 was such that the molar ratio of polymerized units based on TFE/polymerized units based on E/polymerized units based on $CH_2=CHCF_2CF_3$ was 57.3/42.7/2.9. The melting point was 236° C., and the value Q was 5.9 $mm^3/sec$. Further, the number of MIT folding times of the film obtained by forming granule 3 in the same manner as in Example 1, was 117,000 times and the fuel permeability coefficient was 2.67 $gmm/m^2/24$ hr, whereby it was found to be excellent in cracking resistance and fuel barrier properties.

Using granule 3, and in the same manner as in Example 2, pellets 6 of grafted fluorocopolymer composition 3c having an organic peroxide and maleic anhydride incorporated, followed by heat treatment, were obtained. The fuel permeability coefficient of a film obtained by forming pellets 6 in the same manner as in Example 2, was equal to fluorocopolymer 3, whereby it was found to be excellent in cracking resistance and fuel barrier properties.

Using granule 3, pellets 7 of electroconductive fluorocopolymer 3b were prepared in the same manner as in Example 1.

Using polyamide 12 of Example 2, pellets 6 and pellets 7, lamination was carried out in the same manner as in Example 2 to obtain a three layer laminated tube comprising an outer layer of polyamide 12, an interlayer of grafted fluorocopolymer composition 3c and an inner layer of electroconductive fluorocopolymer 3b. The interlayer of grafted fluorocopolymer composition 3c and the inner layer of electroconductive fluorocopolymer 3b could not be peeled and partial cohesive failure was observed, thus showing high adhesion strength. The peel strength between the interlayer of grafted fluorocopolymer composition 3c and the outer layer of polyamide 12, was 45 N/cm, thus showing high adhesion strength.

EXAMPLE 6

Polymerization and granulation were carried out in the same manner as in Example 1 except that instead of $CH_2=CHCF_2CF_3$, $CH_2=CH(CF_2)_4F$ was charged in an amount of 0.42 kg before the polymerization, and the amount charged during-the polymerization was an amount corresponding to 2.0 mol % based on the total molar amount of TFE and E, to obtain 11.8 kg of fluorocopolymer 4 and granule 4. The polymerization time was 5.2 hours. From the results of the melt NMR analysis and the fluorine content analysis, the composition of fluorocopolymer 4 was such that the molar ratio of polymerized units based on TFE/ polymerized units based on E/polymerized units based on $CH_2=CH(CF_2)_4F$ was 58.2/41.8/1.9. The melting point of fluorocopolymer 4 was 235° C., and the value Q was 15.4 $mm^3$/sec.

The number of MIT folding times of a film obtained by forming granule 4 in the same manner as in Example 1, was 87,000 times and the fuel permeability coefficient was 4.23 $gmm/m^2/24$ hr. Thus, the fuel barrier properties are low as compared with Examples.

Using an extruder, granule 4 was melt-kneaded at 260° C. for a retention time of two minutes to obtain pellets 8. Further, using granule 4, pellets 9 of electroconductive fluorocopolymer 4b were obtained in the same manner as in Example 1.

Using pellets 8 and pellets 9, lamination was carried out in the same manner as in Example 1 to obtain a two layer laminated tube comprising an outer layer of fluorocopolymer 4 and an inner layer of electroconductive fluorocopolymer 4b. The outer layer of fluorocopolymer 4 and the inner layer of electroconductive fluorocopolymer 4b could not be peeled, and partial cohesive failure was observed, thus showing high adhesion strength.

As described in the foregoing, the fluorocopolymer of the present invention has a low fuel permeability coefficient and is excellent in fuel barrier properties, and it is also excellent in cracking resistance. Further, it can be co-extruded with other fluoropolymer or non-fluorinated polymer to present a laminate excellent in adhesive properties. The fluorocopolymer of the present invention is useful as a layer-constituting material for a fuel hose made of a multilayer laminate, particularly as a material for constituting the innermost layer which will be in direct contact with a fuel.

Further, a fluorocopolymer composition having an organic peroxide incorporated to the fluorocopolymer of the present invention, followed by heat treatment, and a grafted fluorocopolymer composition having an organic peroxide and a compound having a bonding group capable of being grafted and a functional group capable of imparting adhesive properties incorporated to the fluorocopolymer of the present invention, followed by heat treatment, will be excellent in adhesion to a non-fluorinated polymer such as polyamide and thus will be suitable as a material for constituting a layer for adhering the fluorocopolymer layer and the non-fluorinated polymer layer.

The entire disclosure of Japanese Patent Application No. 2002-035430 filed on Feb. 13, 2002 including specification, claims and summary is incorporated herein by reference in its entirety.

What is claimed is:

1. A fluorocopolymer which comprises (A) polymerized units based on tetrafluoroethylene, (B) polymerized units based on ethylene and (C) polymerized units based on a compound represented by $CH_2=CH(CF_2)_2Y$ wherein Y is a hydrogen atom or a fluorine atom, wherein the molar ratio of (A)/(B) is from 20/80 to 80/20, and the molar ratio of (C)/((A)+(B)) is from 1/1000 to 15/100, and which has a volume flow rate of from 1 to 1000 $mm^3$/sec.

2. The fluorocopolymer according to claim 1, wherein said compound is $CH_2=CH(CF_2)_2F$.

3. The fluorocopolymer according to claim 1, wherein the molar ratio of (A)/(B) is from 50/50 to 70/30.

4. The fluorocopolymer according to claim 1, wherein the molar ratio of (A)/(B) is from 50/50 to 60/40.

5. The fluorocopolymer according to claim 1, wherein the molar ratio of (C)/((A)+(B)) is from 1/200 to 7/100.

6. The fluorocopolymer according to claim 1, wherein the molar ratio of (C)/((A)+(B)) is from 1/100 to 5/100.

7. The fluorocopolymer according to claim 1, which has a fuel permeability coefficient of at most 3.5 $gmm/m^2/24$ hr as measured in accordance with JIS Z0208.

8. The fluorocopolymer according to claim 1, which has a fuel permeability coefficient of at most 3.0 $gmm/m^2/24$ hr as measured in accordance with JIS Z0208.

9. The fluorocopolymer according to claim 1, which has a volume flow rate of from 10 to 200 $mm^3$/sec.

10. A multilayer laminate comprising a layer of the fluorocopolymer as defined in claim 1 and a layer of a non-fluorinated polymer.

11. The fluorocopolymer according to claim 1, wherein Y is a hydrogen atom.

12. A multilayer laminate comprising a layer of the fluorocopolymer as defined in claim 2 and a layer of a non-fluorinated polymer.

13. A multilayer laminate comprising a layer of the fluorocopolymer as defined in claim 11 and a layer of a non-fluorinated polymer.

14. The fluorocopolymer according to claim 1, having a terminal functional group reactive with a non-fluorinated polymer.

15. The fluorocopolymer according to claim 14, wherein said functional group is an ester group or carbonate group, a hydroxyl group, a carboxyl group or a carbonyl fluoride group.

16. The multilayer laminate according to claim 10, wherein the fluorocopolymer has a terminal functional group.

17. The multilayer laminate according to claim 10, having an adhesive layer between the layer of the fluorocopolymer and the layer of the non-fluorinated polymer.

18. The multilayer laminate according to claim 10, obtained by coextrusion.

* * * * *